(12) United States Patent
Mimura

(10) Patent No.: US 8,506,371 B2
(45) Date of Patent: Aug. 13, 2013

(54) GAME DEVICE, GAME DEVICE CONTROL METHOD, PROGRAM, INFORMATION STORAGE MEDIUM

(75) Inventor: Ryuji Mimura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 266 days.

(21) Appl. No.: 12/937,092

(22) PCT Filed: Mar. 17, 2009

(86) PCT No.: PCT/JP2009/055198
§ 371 (c)(1),
(2), (4) Date: Oct. 8, 2010

(87) PCT Pub. No.: WO2010/035527
PCT Pub. Date: Apr. 1, 2010

(65) Prior Publication Data
US 2011/0034245 A1 Feb. 10, 2011

(30) Foreign Application Priority Data
Sep. 25, 2008 (JP) ................. 2008-246860

(51) Int. Cl.
*A63F 9/24* (2006.01)
*A63F 13/00* (2006.01)
*G06F 17/00* (2006.01)
*G06F 19/00* (2006.01)

(52) U.S. Cl.
USPC ............................ 463/4; 463/31

(58) Field of Classification Search
USPC ............... 464/4, 31; 463/4, 31
See application file for complete search history.

(56) References Cited

U.S. PATENT DOCUMENTS

| 7,386,799 | B1 | 6/2008 | Clanton et al. |
| 2002/0041284 | A1 | 4/2002 | Konishi et al. |
| 2003/0166413 | A1 | 9/2003 | Hayashida et al. |
| 2004/0248631 | A1 | 12/2004 | Hirai |
| 2005/0237323 | A1 | 10/2005 | Shimamura et al. |
| 2007/0191098 | A1* | 8/2007 | An ................... 463/40 |
| 2010/0240451 | A1 | 9/2010 | Suzuki et al. |

FOREIGN PATENT DOCUMENTS

| EP | 1147794 A2 | 10/2001 |
| EP | 1391847 A1 | 2/2004 |
| JP | 2002-28366 A | 1/2002 |

(Continued)

OTHER PUBLICATIONS

Taiwanese Office Action corresponding to Taiwanese Patent Application No. 098111124, dated Jun. 12, 2012.

(Continued)

*Primary Examiner* — William M. Brewster
(74) *Attorney, Agent, or Firm* — Sughrue Mion, PLLC

(57) ABSTRACT

To provide a game device for enabling a game player to recognize a positional relationship among respective game characters even when the game characters are located densely in an area. A game data update unit (54) carries out a game in which a plurality of player objects appear. A game screen image display control unit (56) displays a game screen image including the image of a player object. However, when player objects numbering a reference number or more are present within a predetermined noted area, the game screen image display control unit (56) restricts displaying of the images of the player objects and instead shows position indicator images having a smaller area than the images in the game screen image.

17 Claims, 11 Drawing Sheets

(56) References Cited

FOREIGN PATENT DOCUMENTS

| | | |
|---|---|---|
| JP | 2002-063577 A | 2/2002 |
| JP | 2003-210848 A | 7/2003 |
| JP | 2004-073241 A | 3/2004 |
| JP | 2004-321601 A | 11/2004 |
| JP | 2006-312088 A | 11/2006 |
| JP | 2007-259991 A | 10/2007 |
| JP | 2007-260157 A | 10/2007 |
| WO | 2007/111089 A1 | 10/2007 |

OTHER PUBLICATIONS

European Search Report corresponding to European Patent Application No. 09815946.0, dated Jun. 14, 2011.
International Preliminary Report on Patentability and Written Opinion corresponding to International Application No. PCT/JP2009/055198, received May 27, 2011.
Japanese Office Action corresponding to Japanese Patent Application No. 2008-246860, dated May 8, 2012.

* cited by examiner

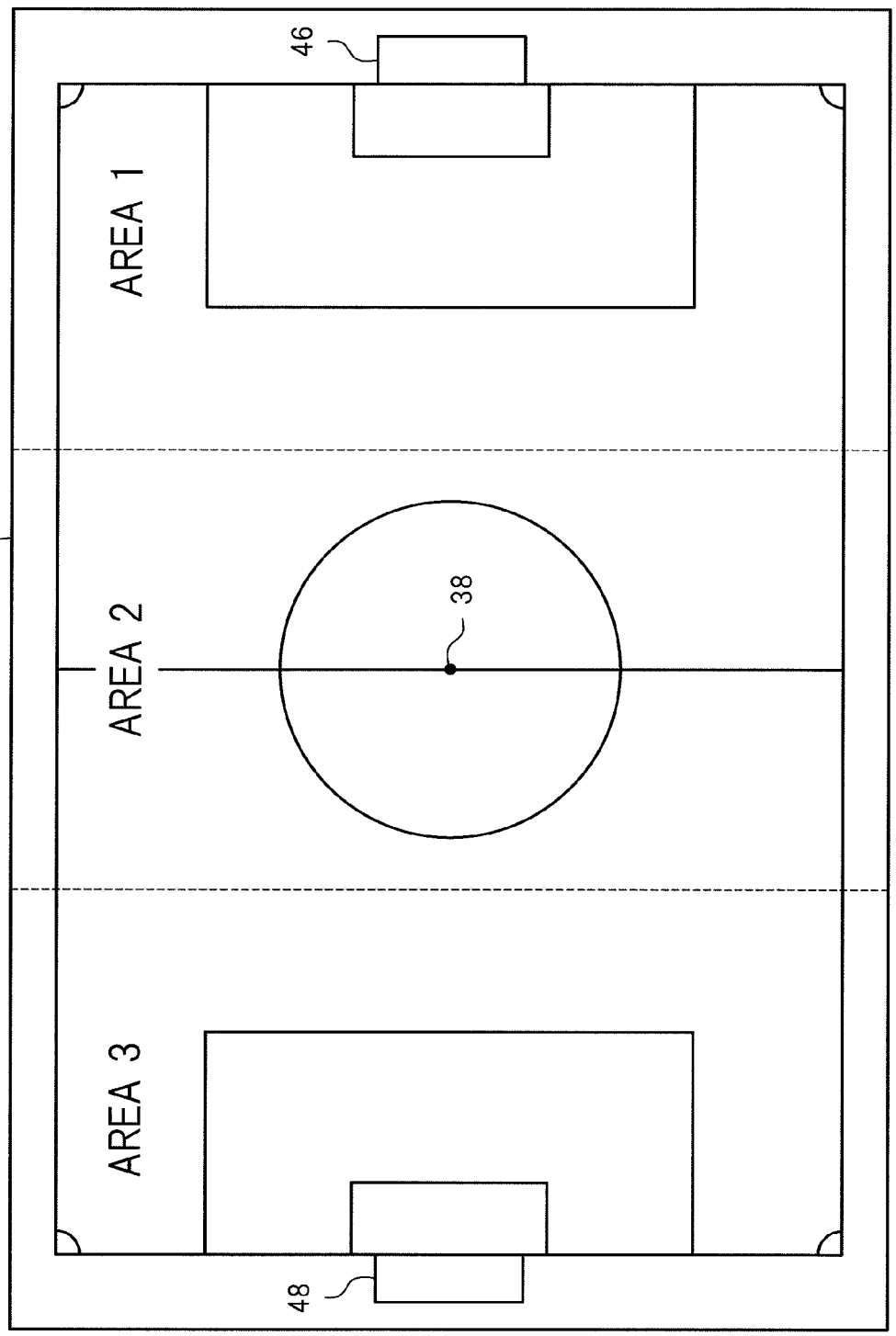

FIG.10

| POSITIONAL CONDITION | REFERENCE DISTANCE | REFERENCE NUMBER |
|---|---|---|
| REFERENCE POSITION WITHIN AREA 1 OR 3 | 20 | 4 |
| REFERENCE POSITION WITHIN AREA 2 | 15 | 3 |

FIG.11

| MOVEMENT MANNER CONDITION | PART TYPE |
|---|---|
| ANGLE BETWEEN INITIAL MOVING DIRECTION OF BALL OBJECT AND XW–ZW PLANE BEING EQUAL TO OR SMALLER THAN PREDETERMINED ANGLE $\theta$ | FOOT |
| ANGLE BETWEEN INITIAL MOVING DIRECTION OF BALL OBJECT AND XW–ZW PLANE BEING LARGER THAN PREDETERMINED ANGLE $\theta$ | PELVIS (HEAD) |

GAME DEVICE, GAME DEVICE CONTROL METHOD, PROGRAM, INFORMATION STORAGE MEDIUM

TECHNICAL FIELD

The present invention relates to a game device, a game device control method, a program, and an information storage medium for carrying out a game in which a plurality of game characters appear.

BACKGROUND ART

There is known a game device for carrying out a game in which a plurality of game characters appear. For example, a soccer game in which a plurality of player characters appear is known (see Patent Document 1 below).

Patent Document 1: Japanese Patent Laid-open Publication No. 2007-260157

DISCLOSURE OF THE INVENTION

Problems to be Solved by the Invention

In the above described game device, the images of a plurality of game characters may be shown densely in an area in a game screen image. In such a case, the image of a game character may be hidden by that of another game character, or the images of game characters may be displayed closely gathered. This may make it difficult for a game player to recognize a positional relationship among the game characters or the orientation of each game character. In addition, a game player may not be able to readily recognize a game character which the game player is operating.

The present invention has been conceived in view of the above, and one of the objects of the present invention is to provide a game device, a game device control method, a program, and an information storage medium for enabling a game player to recognize a positional relationship among respective game characters or orientation of each game character even when the game characters are densely located in an area.

Means for Solving the Problems

In order to achieve the above described object, a game device according to the present invention is a game device comprising: a game executing means for carrying out a game in which a plurality of game characters appear; and a display control means for displaying a game screen image including an image of the game character, wherein the display control means, when game characters numbering a reference number or more are present within a predetermined noted area, restricts displaying of the images of the game characters present within the noted area and instead shows substitute images having a smaller area than the images in the game screen image.

A game device control method according to the present invention is a game device control method comprising: a step of carrying out a game in which a plurality of game characters appear; and a display control step of displaying a game screen image including an image of the game character, wherein the display control step includes a step of restricting, when game characters numbering a reference number or more are present within a predetermined noted area, displaying of the images of the game characters present within the noted area and instead showing substitute images having a smaller area than the images in the game screen image.

A program according to the present invention is a program for causing a computer, such as an installation type game device (a consumer game device), a portable game device, a commercial game device, a portable phone, a personal digital assistant (PDA), a personal computer, or the like, to function as: a game executing means for carrying out a game in which a plurality of game characters appear; and a display control means for displaying a game screen image including an image of the game character, wherein the display control means, when game characters numbering a reference number or more are present within a predetermined noted area, restricts displaying of the images of the game characters present within the noted area and instead shows substitute images having a smaller area than the image in the game screen image.

An information storage medium according to the present invention is a computer readable information storage medium recording the above described program.

The present invention relates to a game device comprising a game executing means for carrying out a game in which a plurality of game characters appear; and a display control means for displaying a game screen image including an image of the game character. According to the present invention, when game characters numbering a reference number or more are present within a predetermined noted area, displaying of the images of game characters present within the noted area is restricted, and substitute images having a smaller area than the images are shown instead in the game screen image. For example, instead of the images of a game characters present within the noted area, substitute images having a smaller area than the images are shown in the game screen image. With the above, according to the present invention, a game player can recognize a positional relationship among the respective game characters and orientation of each game character even when the game characters are located densely in an area.

According to one aspect of the present invention, the game may be a sport game carried out using a moving object; the game character may be a player character; the game device may further comprise a condition storage means for storing a part of the player character so as to be correlated to a condition concerning a manner of movement of the moving object; and the display control means may show a substitute image at a position in the game screen image, the position corresponding to a position of a part correlated to the condition satisfied by the manner of movement of the moving object among the parts of the player characters present within the noted area.

According to one aspect of the present invention, the plurality of game characters may include a game character correlated to an operating group operated by a game player and a game character correlated to an opponent group opposing the operating group; and the display control means may restrict displaying of an image of a game character correlated to the opponent group among the game characters present within the noted area, and show the substitute image instead.

BRIEF DESCRIPTION OF THE DRAWINGS

FIG. 9 is a diagram showing a field object sectioned into a plurality of areas;

FIG. 10 is a diagram showing one example of a position condition table;

FIG. 11 is a diagram showing one example of a movement manner condition table;

BEST MODE FOR CARRYING OUT THE INVENTION

In the following, an embodiment of the present invention will be described with reference to the accompanying drawings.

1. HARDWARE STRUCTURE

Figure 1:
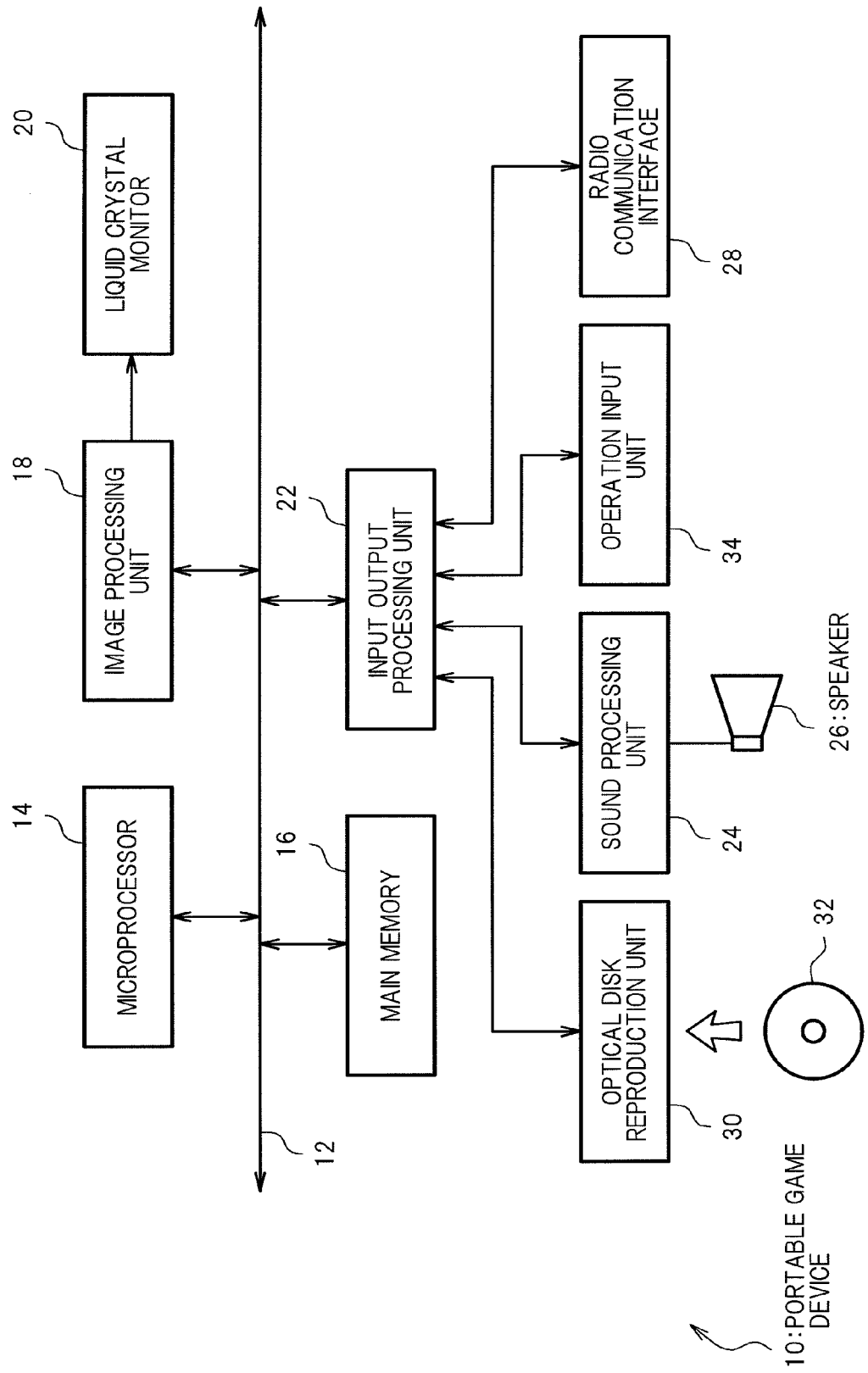
FIG. 1 is a diagram showing a hardware structure of a portable game device according to an embodiment of the present invention.

FIG. 1 shows a hardware structure of a portable game device (a game device) according to an embodiment of the present invention. As shown in FIG. 1, a portable game device 10 is a publicly known computer game system comprising a bus 12, a microprocessor 14, a main memory 16, an image processing unit 18, a liquid crystal monitor 20, an input output processing unit 22, a sound processing unit 24, a speaker 26, a radio communication interface 28, an optical disk reproduction unit 30, an optical disk 32, and an operation input unit 34. These components are accommodated, together with a battery, in an enclosure, so that the portable game device 10 can be driven using the battery. That is, according to the portable game device 10, a game player can enjoy a game wherever they wish to play.

The bus 12 is used to exchange an address and data among the respective units of the portable game device 10. The microprocessor 14, the main memory 16, the image processing unit 18, and the input output processing unit 22 are connected via the bus 12 for data exchange.

The microprocessor 14 controls the respective units of the portable game device 10, based on an operating system stored in a ROM (not shown) and a game program recorded on the optical disk 32. The main memory 16 comprises, e.g., a RAM, into which a game program and game data read from the optical disk 32 are written when necessary. The main memory 16 is used also as a working memory of the microprocessor 14.

The image processing unit 18 includes a VRAM, and an image is rendered into the VRAM, based on image data sent from the microprocessor 14. The image processing unit 18 displays the image rendered in the VRAM as a game screen image on the liquid crystal monitor 20 at a predetermined time. The liquid crystal monitor 20 is a publicly known liquid crystal monitor.

The input output processing unit 22 is an interface via which the microprocessor 14 exchanges data with the sound processing unit 24, the radio communication interface 28, the optical disk reproduction unit 30, and the operation input unit 34. The sound processing unit 24, the radio communication interface 28, the optical disk reproduction unit 30, and the operation input unit 34 are connected to the input output processing unit 22.

The sound processing unit 24 includes a sound buffer, and outputs via the speaker 26 various sound data, including game music, game sound effects, a message, and so forth, having been read from the optical disk 32 and stored in the sound buffer.

The radio communication interface 28 is an interface for radio communication connection between the portable game device 10 and another portable game device 10 and between the portable game device 10 and a communication network, such as the Internet, or the like. The radio communication interface 28 is an interface for radio communication according to, e.g., IEEE 802.11 standard.

According to an instruction from the microprocessor 14, the optical disk reproduction unit 30 reads a game program and game data recorded on the optical disk 32. Note that although the optical disk 32 is used here to supply a game program and game data to the portable game device 10, any other information storage medium, such as, e.g., a game card, and so forth, may be used instead. Alternatively, a game program and game data may be supplied via a communication network, such as the Internet or the like, from a remote place to the portable game device 10. Still alternatively, a game program and game data may be supplied from an installed game device, a personal computer, and so forth, to the portable game device 10, through various data communication, such as infrared communication, and so forth.

The operation input unit 34 is an input means on which a game player inputs a game operation. The operation input unit 34 has, e.g., a direction designation key and one or more buttons. The input output processing unit 22 scans the state of the operation input unit 34 every constant cycle (e.g., every $\frac{1}{60}^{th}$ of a second) and forwards an operating signal describing a scanning result to the microprocessor 14 via the bus 12, so that the microprocessor 14 determines a game operation carried out by a game player, based on the operating signal.

2. GAME PROVIDED IN PORTABLE GAME DEVICE

In the portable game device 10 having the above described hardware structure, a soccer game is carried out by operating a player object (a game character) correlated to a team (hereinafter referred to as an operating team) operated by a game player so that the operating team (an operating group) makes more score events than an opponent team (an opponent group) opposing the operating team. The soccer game is realized by executing a soccer game program read from the optical disk 32.

Figure 2:
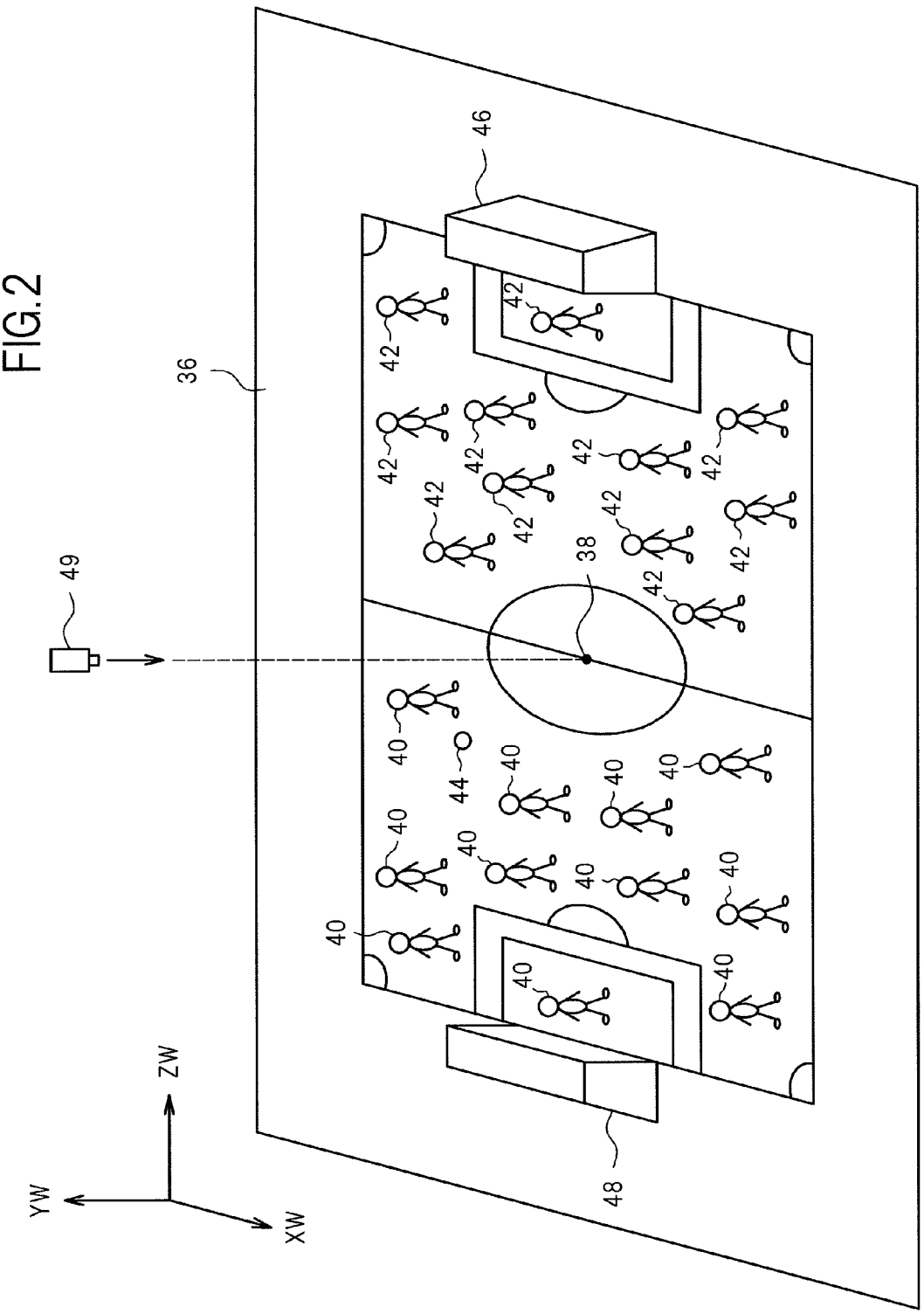
FIG. 2 is a diagram showing one example of a game space.

FIG. 2 is a diagram showing one example of a game space created in the main memory 16 to provide the above described soccer game. Note that although a three dimensional game space will be described here, the game space may be a two dimensional space.

As shown in FIG. 2, the XW, YW, and ZW axes are set in the game space. Any position in the game space is specified using the XW, YW and ZW coordinates (world coordinates)

of the position. In addition, a field object 36 representing a soccer field is placed in the game space so as to be parallel to the XW-ZW plane. The field object 36 has a center mark 38 at the center thereof.

Twenty two player objects 40, 42, a ball object 44 (a moving object) representing a soccer ball, and goal objects 46, 48 are placed in the field object 36.

The goal object 46 is correlated to the opponent team, while the goal object 48 is correlated to the operating team. With the ball object 44 having moved into the goal object 46, a score event occurs for the operating team, and with the ball object 44 having moved into the goal object 48, a score event occurs for the opponent team.

For each of the player objects 40, 42, a virtual skeleton is defined, using, e.g., a skeleton model. In this embodiment, the position of each player object 40, 42 in the game space is specified by the world coordinates of the pelvis of the skeleton model, and posture of each player object 40, 42 is specified by the rotational angle of a respective bone (a rotational angle of a child bone relative to a parent bone) and a relative position of each joint as viewed from the pelvis, the relative position being determined based on the rotational angle of each bone.

Eleven player objects 40 out of the twenty two player objects 40, 42 belong to the operating team, while the remaining eleven player objects 42 belong to the opponent team. The player objects 40 belonging to the operating team are correlated to the operating team, while the player objects 42 belonging to the opponent team are correlated to the opponent team. In the following, a player object 40 correlated to the operating team is referred to as an operating object 40, while a player object 42 correlated to the opponent team is referred to as an opponent object 42. In order to refer to an operating object 40 or an opponent object 42 without discrimination, a reference as a "player object" is used.

In the above described soccer game, any of the operating objects 40 will become an object to be operated by a game player. An operating object 40 operated by a game player will be hereinafter referred to as a game player object. A game player object carries out various operations, based on an operating signal input via the operation input unit 34. For example, when a predetermined button (not shown) is pressed while a game player object holds the ball object 44, the game player object carries out a pass action, kicking the ball object 44 toward a position around any other operating object 40. In this embodiment, the angle by which a game player object kicks the ball object 44 up is determined, depending on the duration of a period with the predetermined button kept pressed. Specifically, a longer period results in a larger angle. That is, for a longer period with the predetermined button pressed, the ball object 44 moves through the air, and for a shorter period with the predetermined button pressed, the ball object 44 moves on the field object 36. Note that a player object other than a game player object carries out various actions according to a predetermined algorithm.

A game player object is switched upon operation by a game player and also according to movement of the ball object 44. For example, when a game player object carries out a pass action, kicking the ball object 44, another operating object 40 then becomes a game player object. Specifically, in this embodiment, when a game player object carries out a pass action, another operating object 40 selected based on the destination of the moving ball object 44 then becomes a game player object, the designation being estimated, based on the moving direction of the ball object 44, and so forth.

In the above described portable game device 10, when the ball object 44 free from any player object bumps into any part of a player object 44, the ball object 44 is then held by the player object 44 or the moving direction of the ball object 44 is then changed. For example, when the ball object 44 bumps into a foot of a player object in a shoot action, the ball object 44 then starts moving toward the goal object 46.

As shown in FIG. 2, a virtual camera 49 is set above the field object 36. Specifically, in this embodiment, the virtual camera 49 is set above the center mark 38. The microprocessor 14 displays on the liquid crystal monitor 20 a game screen image showing a picture obtained by viewing the game space from the virtual camera 49.

The viewing direction of the virtual camera 49 is set in a manner which assists a game player to readily recognize the positions of the respective player objects placed on the field object 36. In this embodiment, as shown in FIG. 2, the viewing direction of the virtual camera 49 is set in the minus direction of the YW axis (that is, the direction toward the center mark 38). Note, however, that the viewing direction of the virtual camera 49 may be set not in the minus direction of the YW axis, but may be set in a "direction forming a predetermined angle (e.g., ten degrees) or a smaller angle relative to the minus direction of the YW axis". The viewing direction of the virtual camera 49 may be changed during a soccer game. Specifically, the microprocessor 14 may desirably change the viewing direction of the virtual camera 49, e.g., within a range in which the angle formed by the viewing direction and the minus direction of the YW axis does not exceed the above described predetermined angle.

Figure 3:
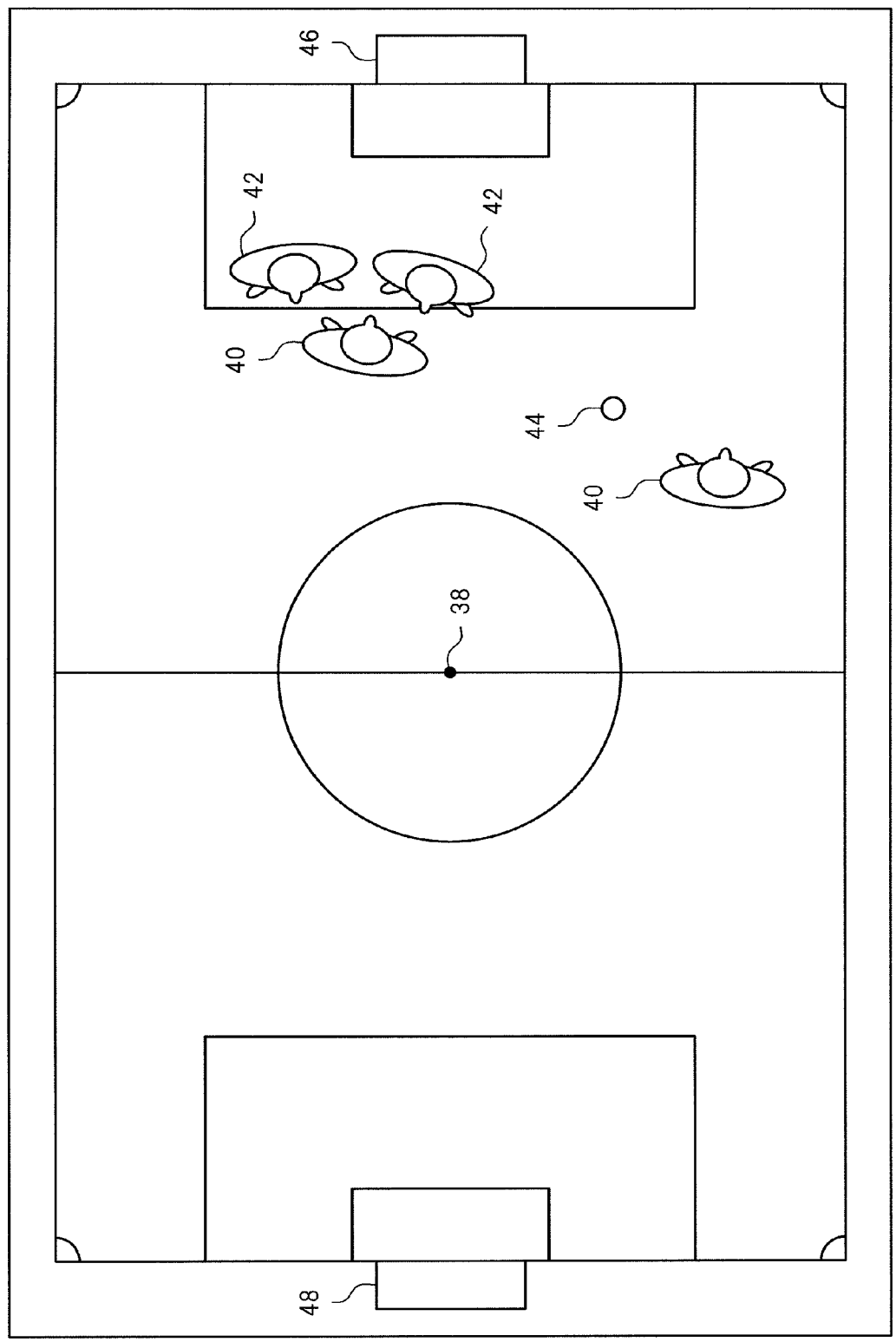
FIG. 3 is a diagram showing one example of a game screen image.

In this embodiment, the height of the virtual camera 47 from the field object 36 (that is, the YW coordinates of the virtual camera 49) is determined such that the view field range of the virtual camera 49 covers the entire field object 36. Thus, as shown in FIG. 3, a game screen image covering the entire field object 36 is displayed on the liquid crystal monitor 20. FIG. 3 shows one example of a game screen image displayed on the liquid crystal monitor 20. As shown in the diagram, a game screen image may include the images of the respective player objects and the image of the ball object 44. Note that, however, the entire field object 36 may not necessarily be covered by the view field range of the virtual camera 49. For example, the microprocessor 14 may move the virtual camera 49 in a direction parallel to the XW-ZW plane, following the movement of the ball object 44, such that at least the ball object 44 is covered by the view field range of the virtual camera 49.

Figure 4:
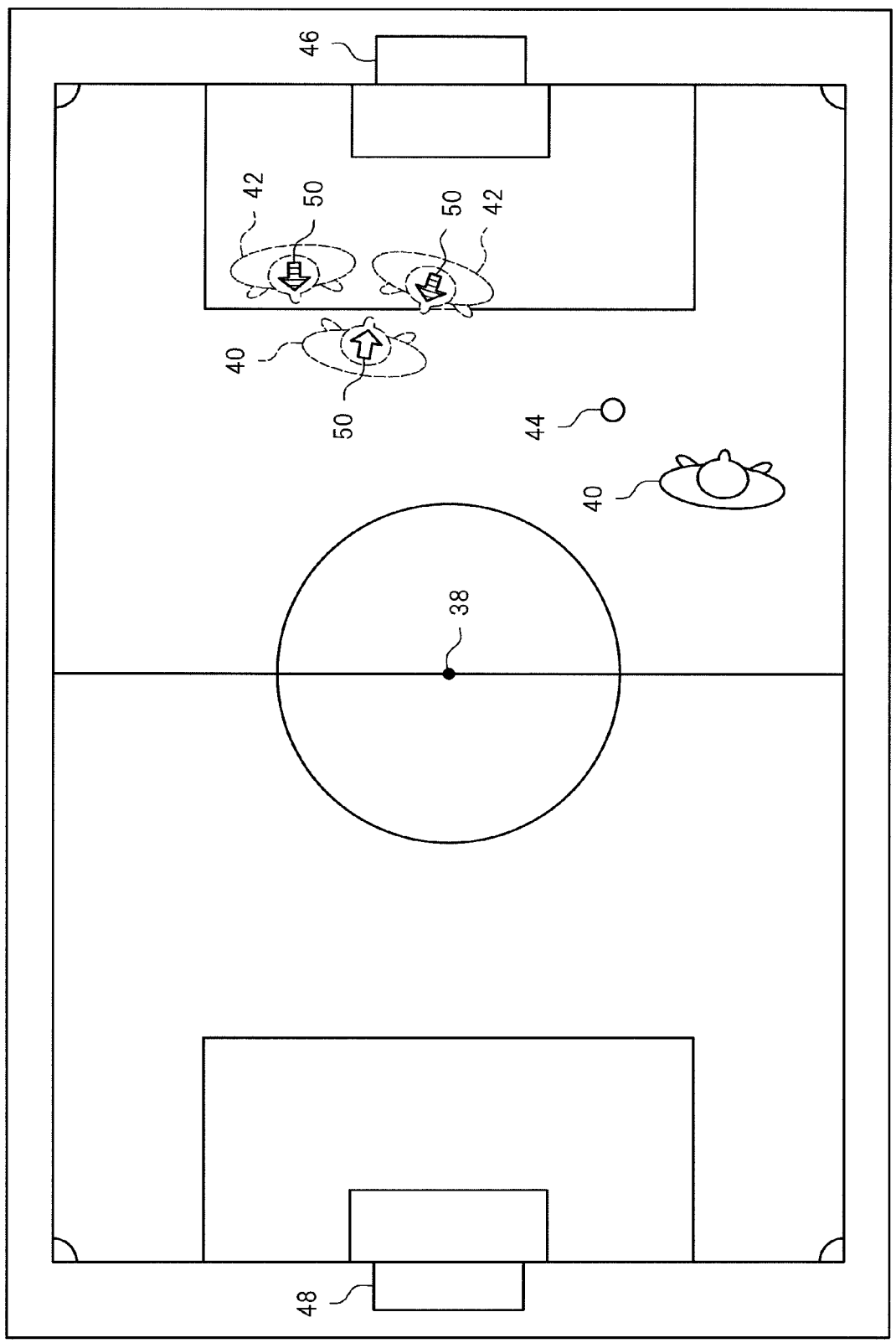
FIG. 4 is a diagram showing one example of a game screen image.

In the above-described soccer game, when a plurality of player objects are densely located, a position indicator image 50 may be shown in the game screen image, instead of the images of the respective player objects, the position indicator image 50 having a smaller area than that of each image. For example, an arrow indicating the front side of a player object may be shown as a position indicator image 50 in the game screen image. FIG. 4 shows one example of a game screen image including a position indicator image 50. With a position indicator image 50 displayed, instead of the image of each player object, a game player can readily recognize a positional relationship among the respective player objects and orientation of each player object even when a plurality of player objects are densely located.

Note that although the image of a player object is indicated by a broken line in FIG. 4, in actuality, the image of a player object is not displayed. Further, although the shown position indicator image 50 in FIG. 4 has an arrow shape, the position indicator image 50 may have any other shape, including, e.g., a circle, a rectangle, or a triangle indicating the front side of each player object.

In the following, a technique for assisting a game player to readily recognize a positional relationship among the player objects and orientation of each player object when a plurality of player objects are densely located will be described.

3. FUNCTION REALIZED IN PORTABLE GAME DEVICE

Figure 5:
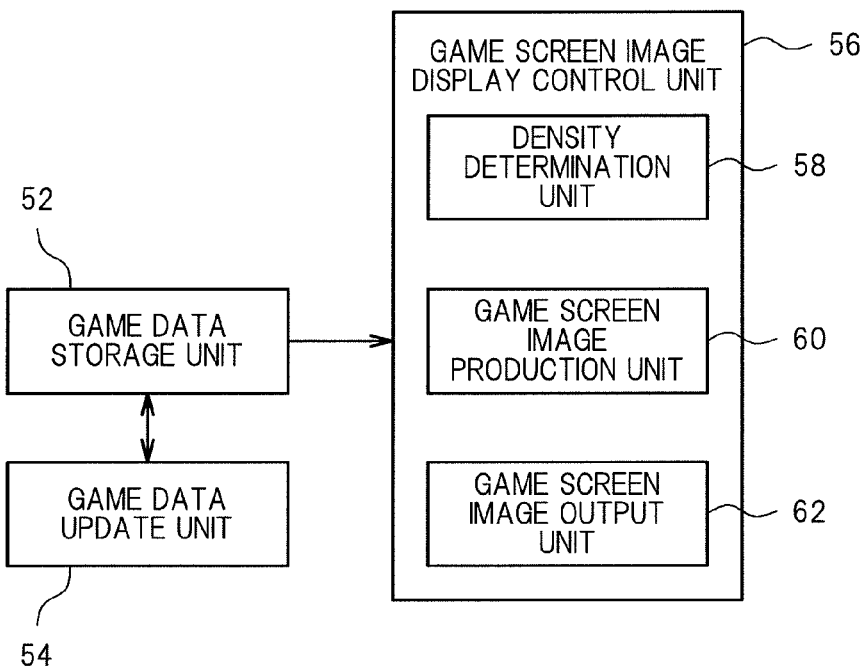
FIG. 5 is a diagram showing a functional block realized in a portable game device according to an embodiment of the present invention.

FIG. 5 is a functional block diagram mainly showing a function according to the present invention among those realized in the portable game device 10. As shown in the diagram, the portable game device 10 comprises a game data storage unit 52, a game data update unit 54 (game executing means), and a game screen image display control unit 56 (display control means). The game screen image display control unit 56 includes a density determination unit 58, a game screen image production unit 60, and a game screen image output unit 62. These functions are realized by the microprocessor 14 by executing a program read from the optical disk 32.

3-1. Game Data Storage Unit

The game data storage unit 52 is realized mainly using the main memory 16 and the optical disk 32. The game data storage unit 52 stores various game data. For example, the game data storage unit 52 stores data recorded in advance on the optical disk 32 (e.g., "motion data on each player object ("a rotational angle of each bone at each time", "a texture image to be pasted on each object", a "position indicator image 50", and so forth)"). The game data storage unit 52 further stores game situation data describing a current situation in the game space (e.g., "position, moving direction, moving speed, and posture of each player (an ID of motion data being reproduced and a reproduction position of the same)", "a position, a moving direction, and a moving speed of the ball object 44", "data specifying the player object holding the ball object 44", "data specifying a game player object", "data concerning the virtual camera 49", and so forth).

3-2. Game Data Update Unit

The game data update unit 54 is realized mainly using the microprocessor 14. The game data update unit 54 updates game situation data stored in the game data storage unit 52, based on an operating signal input via the operation input unit 34 or a predetermined algorithm, to thereby carry out the above described soccer game. For example, when the above described predetermined button is pressed while a game player object holds the ball object 44, the game data update unit 54 determines the initial moving speed and the initial moving direction of the ball object 44. Specifically, in this embodiment, the initial moving direction is determined such that when the predetermined button is kept pressed for a longer period, a larger angle is formed between the initial moving direction and the XW-ZW plane. Then, the game data update unit 54 carries out a predetermined physical operation to update the subsequent moving speed and direction and position of the ball object 44.

3-3. Game Screen Image Display Control Unit

The game screen image display control unit 56 is realized mainly using the microprocessor 14 and the image processing unit 18. The game screen image display control unit 56 displays a game screen image showing a picture obtained by viewing the game space from the virtual camera 49 on the liquid crystal monitor 20. However, when player objects numbering a reference number N (N being an integer equal to or larger than two) or more are present in a predetermined noted area, the game screen image display control unit 56 restricts displaying of the image of at least one of the player objects present within the noted area, and shows a position indicator image 50 instead in the game screen image. In this embodiment, when player objects numbering the reference number N or more are present in the noted area, the game screen image display control unit 56 shows the position indicator images 50 in the game screen image, instead of the images of the player objects present in the noted area. In the following, the density determination unit 58, the game screen image production unit 60, and the game screen image output unit 62 included in the game screen image display control unit 56 will be described.

3-4. Density Determination Unit

The density determination unit 58 is realized mainly using the microprocessor 14. The density determination unit 58 determines whether or not a predetermined density condition is satisfied. A density condition refers to a condition to be satisfied when player objects numbering a reference number N or more are present in a noted area.

In this embodiment, when the above described predetermined button is pressed while the game player object holds the ball object 44 (the game player object holding the ball object 44 carries out a pass action), the density determination unit 58 determines a reference position which is used as a reference in determination of a noted area, based on the initial moving speed and direction of the ball object 44. Then, the density determination unit 58 determines whether or not the density condition is satisfied, using an area containing the reference position as a noted area.

Specifically, the density determination unit 58 determines a reference position, based on the falling point of the ball object 44, the falling position being estimated based on the initial moving speed and direction of the ball object 44. For example, the density determination unit 58 determines the falling point itself of the ball object 44 as a reference position. Alternatively, for example, the density determination unit 58 initially selects an operating object 40 (hereinafter referred to as a noted player object) which will next become a game player object after the current game player object having carried out a pass action, based on the falling point of the ball object 44, and then determines a reference position, based on the position of the noted player object. To determine a reference position, based on the position of a noted player object, the density determination unit 58 may determine as a reference position the position of an opponent object 42 located by the shortest distance away from the noted player object or the position of the noted player object itself. In the latter case, or when the position of a noted player object is determined as a reference position, selection of a noted player object itself corresponds to determination of a reference position. Note that a noted player object may be, e.g., an operating object 40 located the shortest distance away from the falling point of the ball object 44.

With a reference position determined, the density determination unit 58 then determines whether or not the density condition is satisfied. Specifically, for example, when the reference position is not the position of a noted player object, the density determination unit 58 determines whether or not player objects numbering N or more are present within the noted area, to thereby determine whether or not the density condition is satisfied. In this case, when player objects numbering N or more are present in the noted area, the density determination unit 58 determines that the density condition is satisfied. Meanwhile, when the reference position is the position of a noted player object, the density determination unit 58 determines whether or not player objects other than the noted player object numbering "N−1" or more are present within the noted area, as presence of the noted player object within the noted area is obvious. In this case, when player objects other than the noted player object numbering "N−1" or more are present within the noted area, the density determination unit 58 determines that the density condition is satisfied.

Figure 6:
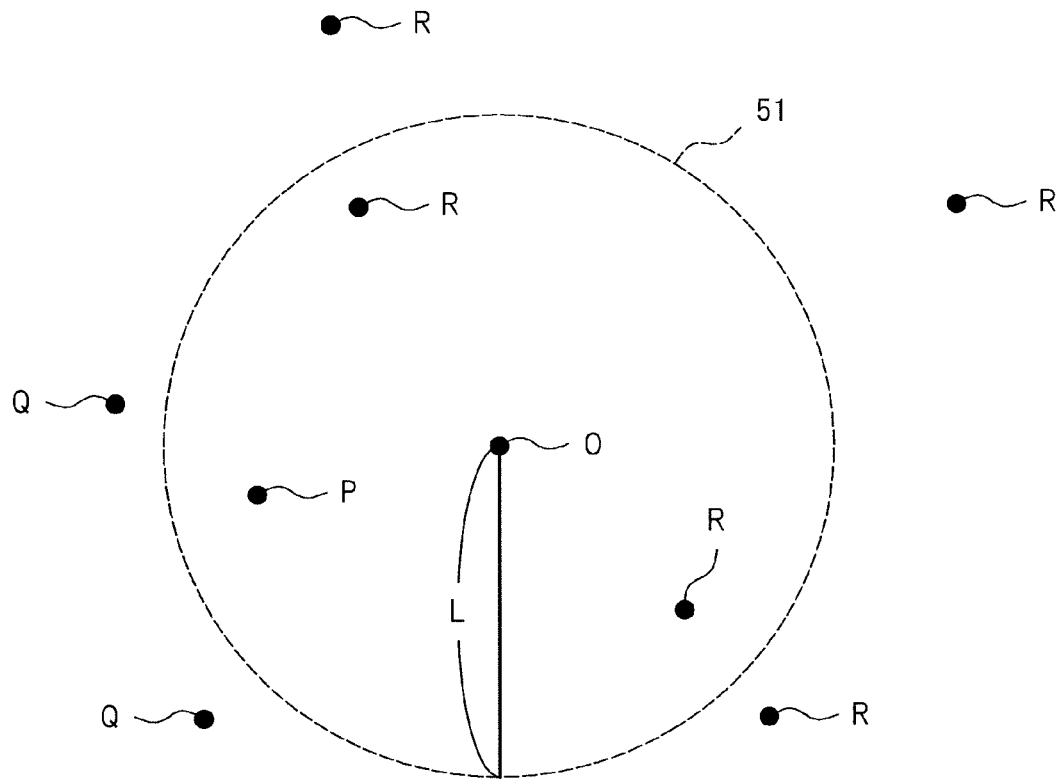
FIG. 6 is a diagram showing one example of a positional relationship between a noted player object and other player objects.

FIG. 6 is a diagram showing one example of a positional relationship among the reference position and respective player objects. The point O represents a reference position; the point P represents a game player object; the point Q represents an operating object 40 other than the game player object; and the point R represents an opponent object 42. When the position of a noted player object is the reference position O, the position P of the game player object is the reference position O. Note that the position of the pelvis of a skeleton model of each player object is considered as the position of the player object, as described above.

An area enclosed by the broken line represents a noted area 51. In this diagram, an area within a reference distance L from the point O is defined as the noted area 51. Note that the points O, P, Q, and R may be the "positions in the game space (the world coordinate space)" or "positions in a game screen image (a screen coordinate flat surface)" of a reference position, a game player object, an operating object 40 other than the game player object, and an opponent object 42, respectively. Although the shown noted area 51 is of a sphere or a circle having the reference position O as the center in this diagram, the noted area 51 may have any other shape (e.g., a cube or a quadrangle with the reference position O as a barycenter, or the like).

3-5. Game Screen Image Production Unit

The game screen image production unit 60 is realized mainly using the microprocessor 14 and the image processing unit 18. The game screen image production unit 60 produces an image showing a picture obtained by viewing the game space from the virtual camera 4, based on game situation data stored in the game data storage unit 52. Specifically, the game screen image production unit 60 initially carries out a geometry process to convert a world coordinate system to a screen coordinate system, and then a rendering process to produce an image. The game screen image production unit 60 renders the thus produced image in the VRAM.

However, when the density condition is satisfied, the game screen image production unit 60 renders an image in the VRAM such that a position indicator image 50, instead of the image of a player object present within the noted area 51, is shown in the game screen image.

For example, the game screen image production unit 60 initially sets a player object within the noted area 51 to be transparent, and then produces an image showing a picture obtained by viewing the game space from the virtual camera 49. Thereafter, the game screen image production unit 60 renders the image in the VRAM and then renders for overwriting a position indicator image 50 in the position specified by the screen coordinates of the player object present within the noted area 51. Note that a position specified by screen coordinates will be hereinafter referred to as a screen position.

Alternatively, for example, the game screen image production unit 60 may place a position indication object (e.g., a spherical object smaller in diameter than the shoulder width of a player object) and smaller in width in the direction parallel to the XW-ZW plane than the shoulder width of a player object within the noted area 51, instead of the player object, then produce an image showing a picture obtained by viewing the game space from the virtual camera 49, and render the thus produced image in the VRAM. In this manner also, a position indicator image 50 smaller in area than the image of a player object present within the noted area 51 can be shown in a game screen image, instead of the image of the player object itself.

3-6. Game Screen Image Output Unit

The game screen image output unit 62 is realized mainly using the image processing unit 18. The game screen image output unit 62 displays an image rendered in the VRAM as a game screen image on the liquid crystal monitor 20.

4. PROCESS CARRIED OUT IN PORTABLE GAME DEVICE

Figure 7:
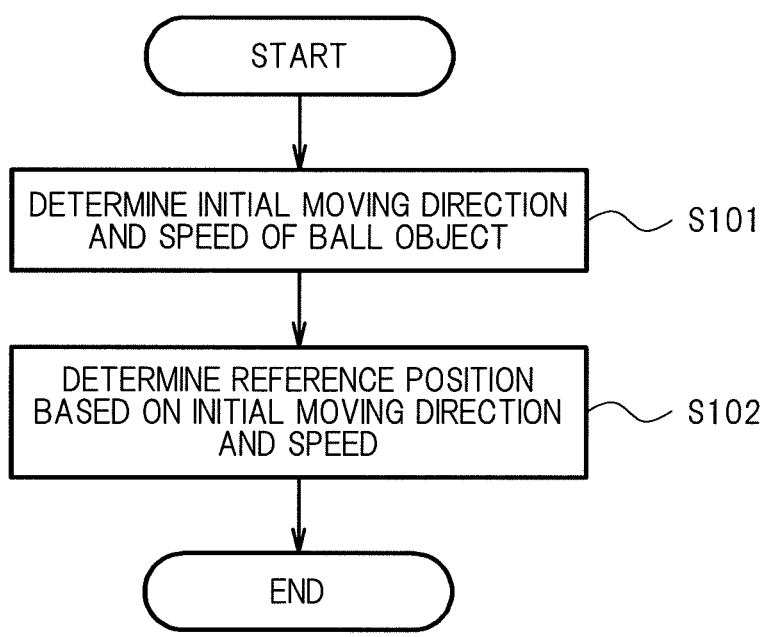
FIG. 7 is a flowchart of a process carried out in a portable game device according to an embodiment of the present invention.
Figure 8:
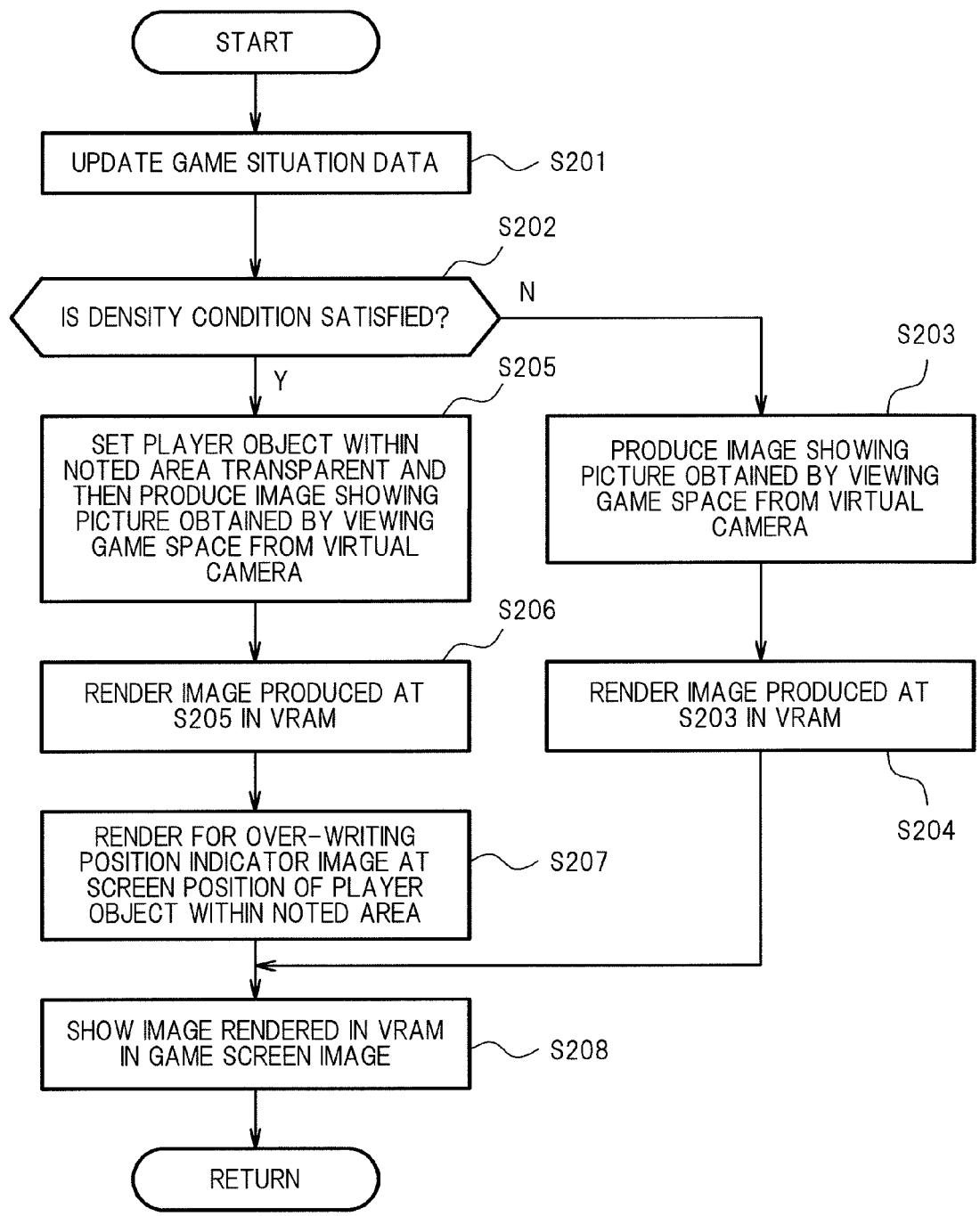
FIG. 8 is a flowchart of a process carried out in a portable game device according to an embodiment of the present invention.

FIGS. 7 and 8 are flowcharts of a process to be carried out in the portable game device 10. The process shown in FIGS. 7 and 8 is carried out by the microprocessor 14 operating according to a program recorded on the optical disk 32.

4-1. Process Carried Out when Above-Described Predetermined Button is Pressed while Game Player Object Holds Ball Object The flowchart shown in FIG. 7 will be described. This process is carried out when the above described predetermined button is pressed while a game player object holds the ball object 44.

Specifically, the microprocessor 14 determines the initial moving speed and direction of the ball object 44 (S101). In the above, the microprocessor 14 determines the initial moving direction such that when the predetermined button is kept pressed for a longer period, a larger angle is formed between the initial moving direction and the XW-ZW plane.

Then, the microprocessor 14 determines a reference position O, based on the initial moving speed and direction (S102). Specifically, for example, the microprocessor 14 carries out a predetermined physical operation to calculate the falling point of the ball object 44, based on the position and the initial moving speed and direction of the ball object 44, and then determines a reference position O, based on the falling point. In the above, for example, the microprocessor 14 may determine the falling point itself as a reference position O. Alternatively, the microprocessor 14 may determine the position P of a noted player object located the shortest distance away from the falling point (that is, an operating object 40 to next become a game player object) as a reference position O. Still alternatively, for example, the microprocessor 14 may determine the position R of an opponent object 42 located the shortest distance away from the noted player object as a reference position O.

4-2. Process Carried Out when Reference Position Determined

The flowchart shown in FIG. 8 will be described. After determination of the reference position O in the process shown in FIG. 7, the process shown in FIG. 8 is carried out every processing time which arrives with a predetermined interval (e.g., every 1/60th of a second). This process is kept being carried out until, e.g., the ball object 44 bumps into any player object.

Specifically, the microprocessor 14 (game executing means) updates the game situation data (S201). For example, the microprocessor 14 updates the moving speed and direction of the ball object 44, based on the result of the above described physical operation, and updates the position of the ball object 44, based on the moving speed and direction of the ball object 44.

Then, the microprocessor 14 (display control means) carries out the process at S202 to determine whether or not the density condition is satisfied.

For example, when the reference position O is not the position P of a noted player object, the microprocessor 14 determines whether or not player objects numbering N or more are present within the noted area 51. Specifically, for example, by determining whether or not there are player objects numbering N or more, each located within the reference distance L from the reference position O, the microprocessor 14 determines whether or not player objects numbering N or more are present within the noted area 51. When player objects numbering N or more are present in the noted area 51, the microprocessor 14 determines that the density condition is satisfied.

Meanwhile, when the reference position O is, e.g., the position P of a noted player object, the microprocessor 14 determines whether or not player objects other than the noted player object numbering "N−1" or more are present within the noted area 51, as presence of the noted player object within the noted area 51 is obvious. For example, by determining whether or not there are player objects numbering N−1 or more, each located within the reference distance L from the noted player object (that is, the reference position O), the microprocessor 14 determines whether or not player objects other than the noted player object numbering N−1 or more are present within the noted area 51. When player objects other than the noted player object numbering N−1 or more are present within the noted area 51, the microprocessor 14 determines that the density condition is satisfied.

When the density condition is not satisfied (N at S202), an image to be shown as a game screen image is rendered in the VRAM through the process at S203 to S204.

That is, the microprocessor 14 (display control means) produces an image showing a picture obtained by viewing the game space from the virtual camera 49 (S203). Specifically, the microprocessor 14 first carries out a geometry process to convert a world coordinate system to a screen coordinate system, and then a rendering process to produce an image. After the above-described image production, the microprocessor 14 (display control means) renders the image in the VRAM (S204). With the above, the image shown in FIG. 3 is formed in the VRAM.

Meanwhile, when the density condition is satisfied (Y at S202), an image to be shown as a game screen image is rendered in the VRAM through the process at S205 to S207.

That is, the microprocessor 14 (display control means) first sets a player object present within the noted area 51 to be transparent, then produces an image showing a picture obtained by viewing the game space from the virtual camera 49 (S205), and renders the produced image in the VRAM (S206). Specifically, for example, the microprocessor 14 initially sets the α value of a player object present within the noted area 51 to 0 at S205, to thereby set the player object transparent, and then produces an image showing a picture obtained by viewing the game space from the virtual camera 49, similar to S203.

Further, the microprocessor 14 (display control means) renders for over-writing a position indicator image 50 at the screen position of a player object present within the noted area 51 in S207 (S207). In the above, the microprocessor 14 discriminates the position indicator image 50 of an operating object 40 and that of an opponent object 42, both located within the noted area 51, by color. As a result, the image shown in FIG. 4 is formed in the VRAM. Note that the microprocessor 14 may further discriminate the position indicator image 50 of a noted player object and that of an operating object 40, both located within the noted area 51, by color.

After S204 or S207, the image processing unit 18 displays the image rendered in the VRAM as a game screen image on the liquid crystal monitor 20 (S208).

5. CONCLUSION

As described above, in the portable game device 10, when player objects numbering a reference number N or more are present within the noted area 51, a position indicator image 50 smaller in area than the image of a respective player object is displayed instead of the image. This leaves a space between the player objects even when they are densely located in the portable game device 10, which makes it easier for a game player to recognize a positional relationship among the player objects and orientation of each player object.

6. MODIFIED EXAMPLES

The present invention is not limited to the above-described embodiment.

6-1. First Modified Example

For example, a clipped image of the image of a player object present within a noted area 51 may be shown as a position indicator image 50 in the game screen image. In this case, for example, the microprocessor 14 first produces an image (hereinafter referred to as a character image) showing a picture obtained by viewing a player object present within the noted area 51 from the virtual camera 49, and then renders for over-writing a clipped image of the character image at the screen position of the player object present within the noted area 51 in S207. With the above, a game player can readily recognize a positional relationship among the player objects present within the noted area 51 and orientation of each player object, without deteriorating reality in displaying the game screen image.

6-2. Second Modified Example

For example, when the ball object 44 is moving near the goal object 46, 48, a game player needs to be more aware of the position of a player object far away from the game player object, compared to when the ball object 44 is moving in an area far from the goal object 46 (e.g., when the ball object 44 is moving near the center mark 38) in order to allow the game player object to reliably shoot the ball object 44, or to prevent losing points.

In view of the above, the microprocessor 14 may change the size of the noted area 51, depending on the reference position O. However, in the above, if the reference number N remains the same number, reality in displaying a game screen image may possibly be excessively deteriorated, depending on the number set as the reference number N. For example, when an excessively small number in view of the size of the noted area 51 is set as the reference number N, displaying of the image of a player object present within the noted area 51 may be resultantly restricted even though player objects are not very densely located within the noted area 51. To address the above, the microprocessor 14 may change the number to be set as a reference number N, depending on the reference position O. This aspect will be described in the following.

In this case, as shown in FIG. 9, the field object 36 is divided into a plurality of sections, namely, areas 1 to 3, and a position condition table for storing a value of a parameter for determining the size of a noted area 51 and a value to be set as a reference number N so as to be correlated to a position condition concerning the reference position O is prepared. For example, a value of the reference distance L is stored as a value of the above described parameter in this position condition table. FIG. 10 is a diagram showing one example of the position condition table. With the above, the microprocessor 14 specifies a position condition satisfied by the reference position O, and then carries out the process shown in FIG. 8, using the values of the reference distance L and the reference number N, both correlated to the specified position condition. With the above, the size of the noted area 51 and the reference number N will change according to the reference position O. Resultantly, the reference number N will change according to the size of the noted area 51.

Therefore, according to the position condition table shown in FIG. 10, for example, the noted area 51 has a larger size when the ball object 44 moves near the goal object 46, 48 than that when the ball object 44 moves near the center mark 38. Therefore, when the ball object 44 moves near the goal object 46, 48, a game player can recognize the position of a player object in a wider range than that when the ball object 44 moves near the center mark 38. However, note that when only a relatively small number of player objects in view of the size of the noted area 51 are present within the noted area 51, displaying of the images of the player objects present within the noted area 51 is not restricted, so that deterioration of reality in displaying a game screen image can be prevented even though the size of the noted area is changed.

6-3. Third Modified Example

In the above-described embodiment, displaying of the images of all player objects present within the noted area 51 is restricted. In an actual game, however, it is particularly necessary for a game player to know the accurate positional relationship between a game player object and an opponent object 42 in order to cause the game player object to reliably hold or shoot the ball object 44 which is moving.

In view of the above, displaying of the image of an opponent object 42 among the player objects within the noted area 51 may be restricted. For this purpose, specifically, the microprocessor 14 initially sets transparent an opponent object 42 among the player objects present within the noted area 51 at S205, and then renders for over-writing a position indication image 50 in the screen position of the opponent object 42 at S207. With the above, a game player can recognize a positional relationship between the game player object and an opponent object 42 present within the noted area 51 and orientation of each opponent object 42. As a result, a game player can cause the game player object to reliably hold or shoot the moving ball object 44. In this case, as displaying of the image of only an opponent object 42 present within the noted area 51 is restricted, reality in displaying a game screen image is not deteriorated as much as when displaying of the images of all player objects present within the noted area 51 is restricted.

6-4. Fourth Modified Example

As one aspect according to which displaying of the image of a player object present within the noted area 51 is restricted, an aspect according to which the image of a player object present within the noted area 51 is not shown in a game screen image is described in the above. However, an aspect according to which displaying of a player object present within the noted area 51 is restricted is not limited to the above described aspect. For example, the image of a player object present within the noted area 51 may be displayed semi-transparent. In this case, the microprocessor 14 may set the α value of a player object present within the noted area 51 to a value (e.g., 0.5) other than "0" or "1" at S205. With this setting, a game player can readily recognize a positional relationship among the player objects present within the noted area 51 and orientation of each player object without deteriorating reality in displaying a game screen image.

6-5. Fifth Modified Example

Further, for example, in the above-described embodiment, to give a more accurate description, the microprocessor 14 displays a position indicator image 50 at the screen position of the "pelvis" of a player object present within the noted area 51. However, in view of the fact that when the ball object 44 not held by any player object bumps into any part of a player object, the ball object 44 is thereupon held by the player object, or the moving direction thereof is thereupon changed, a game player needs to know the accurate position of the feet of each player object within the noted area 51 in order to cause the game player object to reliably hold or shoot the ball object 44 which is moving on the field object 36. Further, in order to cause the game player object to head the ball object 44, a game player needs to know the accurate position of the head of the game player object. In view of the above, apart of a player object, the position of which a game player may wish to know, may differ depending on the manner of movement of the ball object 44. Therefore, the microprocessor 14 may show a position indicator image 50 at a different position in a game screen image, depending on the manner of movement of the ball object 44.

In this case, a movement manner condition table for correlating apart of a player object and a movement manner condition concerning a manner of movement of the ball object 44 may be stored in advance in the main memory 16 (condition storage means). FIG. 11 shows one example of content of the movement manner condition table. As shown in the diagram, a condition concerning the angle formed by the initial moving direction of the ball object 44 and the XW-ZW plane is stored as a movement manner condition in the movement manner condition table. According to this table, a movement manner condition correlated to a "foot" is satisfied when the angle formed by the initial moving direction of the ball object 44 and the XW-ZW plane is equal to or smaller than a predetermined angle θ (e.g., five degrees), and a movement manner condition correlated to a "pelvis (head)" is satisfied when the angle is equal to or larger than the predetermined angle θ.

Figure 12:
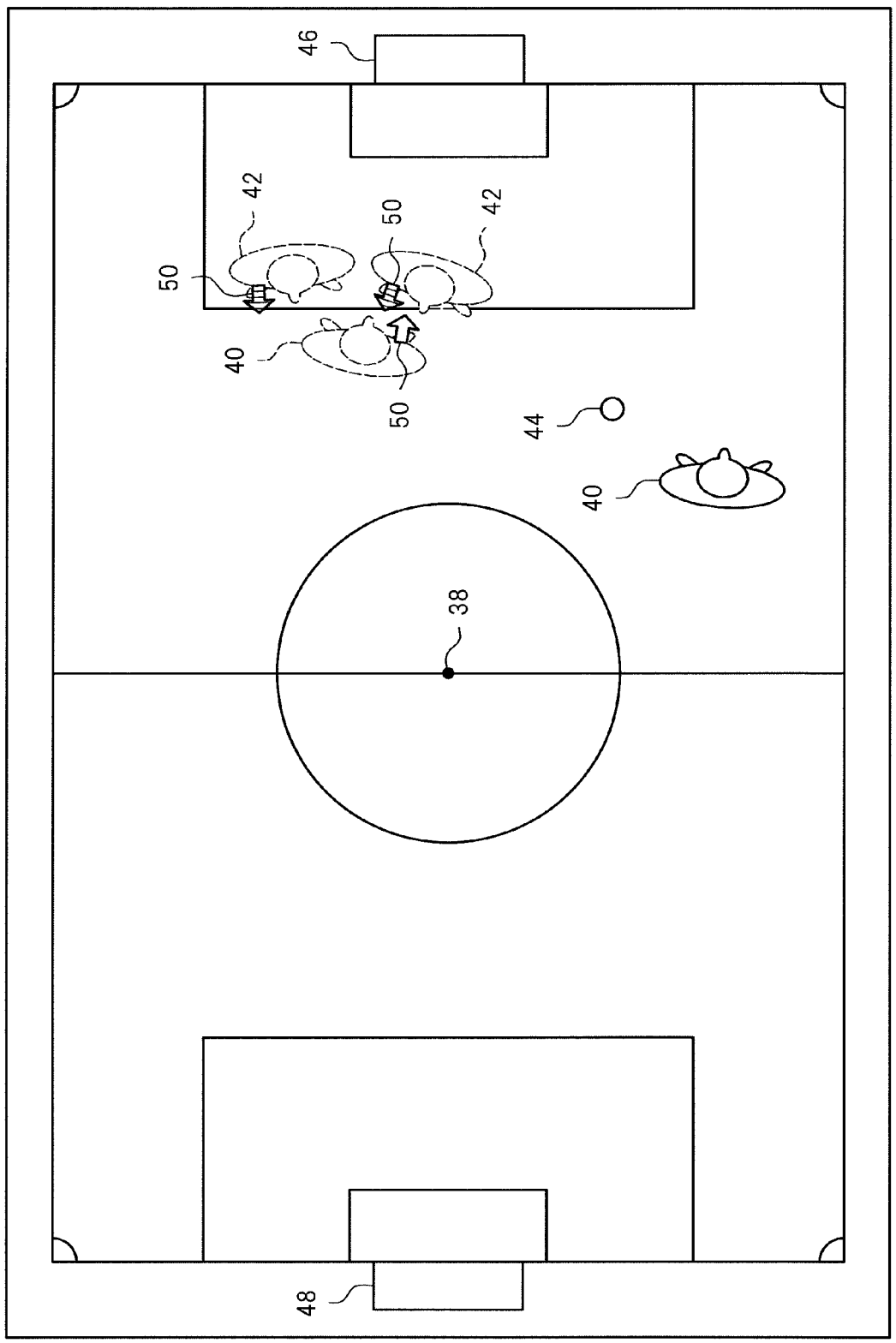
FIG. 12 is a diagram showing one example of a game screen image.

Then, the microprocessor 14 (display control means) specifies a movement manner condition satisfied by the initial moving direction of the ball object 44, and renders for over-writing in S207 a position indicator image 50 at the screen position of the part correlated to the movement manner condition. As a result, the image shown in FIG. 12 is formed in the VRAM when the angle formed by the initial moving direction of the ball object 44 and the XW-ZW plane is small. Note that the microprocessor 14 may calculate the screen position of a part of a player object by first calculating the world coordinates of the part based on the position of the pelvis and a relative position of each joint as viewed from the pelvis, the relative position being determined based on the rotational angle of each bone of the player object, and then converting the obtained world coordinates into screen coordinates.

With the above, the position of a position indicator image 50 shown in a game screen image is changed, depending on the manner of movement of the ball object 44, so that a game player can cause the game player object to reliably hold or shoot the ball object 44 which is moving.

Note that although a case in which a condition concerning the angle formed by the initial moving direction of the ball object 44 and the XW-ZW plane is used as a movement manner condition is described in the above, any other condition may be employed as a movement manner condition. For example, a movement manner condition may be a condition concerning the positions of the ball object 44 at respective process times, including the current process time and M (e.g., M=5) preceding process times.

6-6. Sixth Modified Example

For example, in the above described portable game device 10, in which the viewing direction of the virtual camera 49 is set in the minus direction of the YW axis, the height at which the ball object 44 is moving is not readily known from the game screen image. Therefore, in the portable game device 10, a game player trying to cause the game player object to head the ball object 44 may not readily determine a time at which to cause the game player object to head the ball object 44. In view of the above, the microprocessor 14 may show an image related to the height (YW coordinates) of the head of the game player object and the height (YW coordinates) of the ball object 44 in a game screen image. In the following, this aspect will be described.

Figure 13:
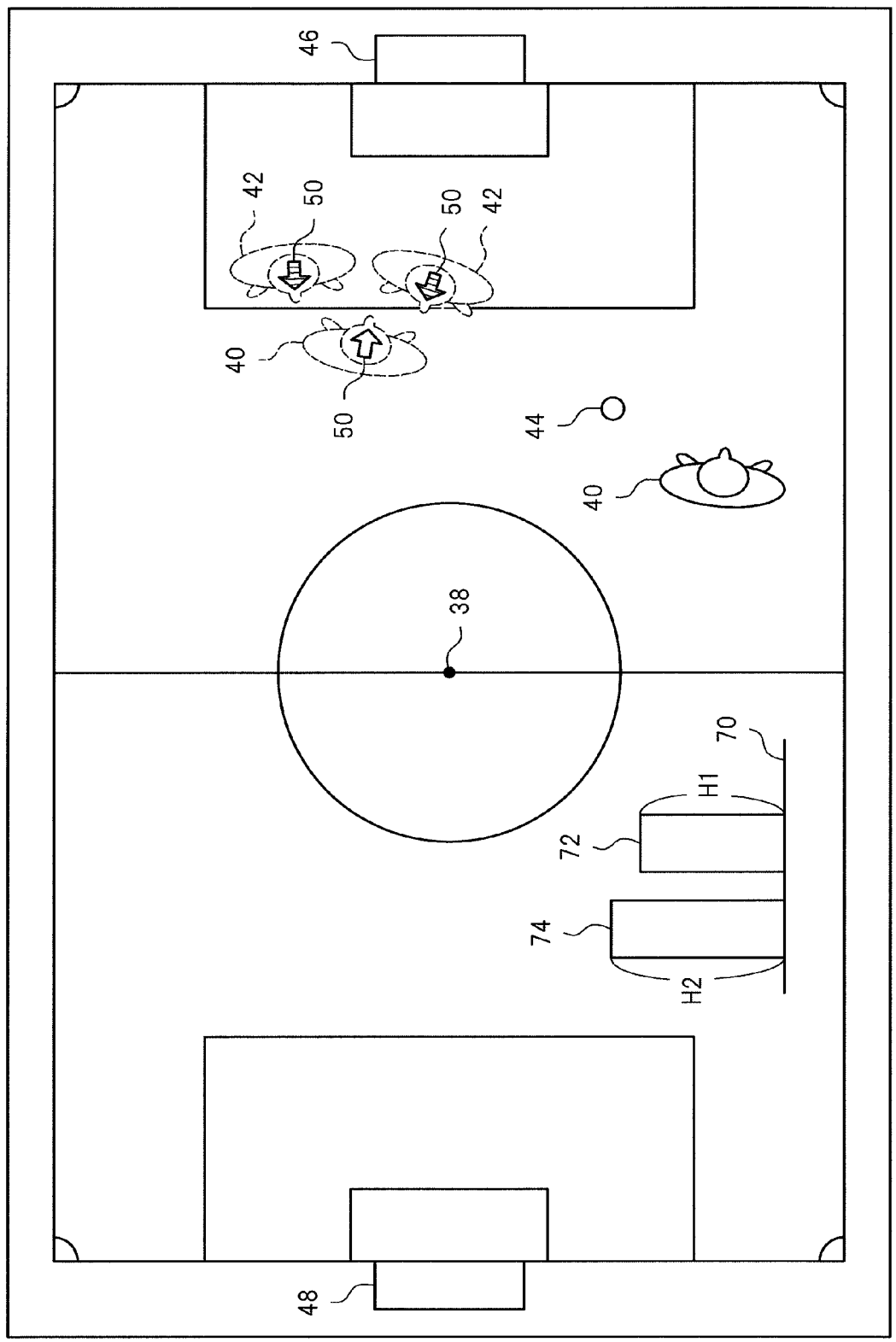
FIG. 13 is a diagram showing one example of a game screen image.

FIG. 13 shows one example of a game screen image according to this aspect. Specifically, according to this aspect, the microprocessor 14 displays a first gauge image 72 and a second gauge image 74, in which the first gauge image 72 becomes larger with respect to larger YW coordinates of the head of a game player object, and the second gauge image 74 becomes larger with respect to larger YW coordinates of the ball object 44. In this case, the microprocessor 14 renders for over-writing the first gauge image 72 and the second gauge image 74 so as to be placed side by side and to extend upwards from a reference line 70 in the VRAM at S208. In the above, the microprocessor 14 determines the value of the height H1 of the first gauge image 72 so as to become larger with respect to larger YW coordinates of the head of the game player object and the value of the height H2 of the second gauge image 74 so as to become larger with respect to larger YW coordinates of the ball object 44. For example, the microprocessor 14 substitutes the values of the YW coordinates of the head of the game player object into a predetermined expression to calculate the value of the height H1, and also substitutes the values of the YW coordinates of the ball object 44 into the above described expression to calculate the value of the height H2. According to this aspect, a game player can know the difference in height between the position of the head of the game player object and that of the ball object 44, based on the difference between the height H1 of the first gauge image 72 and the height H2 of the second gauge image 74, and can determine a time at which to cause the game player object to head the ball object 44.

7. OTHERS

Although a case in which a game device is a portable game device 10 is described in the above, a game device is not limited to a portable game device 10, but may be a consumer game device, a commercial game device, a portable phone, a personal digital assistant (PDA), or a personal computer.

Although a case in which a soccer game is played in the portable game device 10 is described in the above, any other game with a plurality of game characters appearing can be played in the portable game device 10. For example, a game to be played in the portable game device 10 may include a gun shooting game with a plurality of game characters appearing. In this case, a bullet corresponds to the moving object. Further, a game to be played in the portable game device 10 may include a sport game (e.g., a basket ball game, an ice hockey game, an American football game, a rugby game, a volleyball game, a hand ball game, a water polo game, and so forth) other than a soccer game. In this case, a ball or a puck corresponds to the moving object.

The invention claimed is:

1. A game device, comprising:
   at least one microprocessor that carries out a game in which a plurality of game characters appear; and
   a display controller that displays a game screen image including images of the game characters,
   wherein
   the display controller, determines a density of game characters within a subset area that is a subset of the game screen image, and when the density is greater than or equal to a non-zero threshold density, restricts displaying of an image of a game character present within the subset area and instead shows a substitute image having a smaller area than the image of the game character in the game screen image.

2. The game device according to claim 1, wherein
   the game is a sport game carried out using a moving object,
   the game characters include a player character,
   the game device further comprises at least one memory that stores a part of the player character so as to be correlated to a condition concerning a manner of movement of the moving object, and
   the display controller shows the substitute image at a position in the game screen image, the position corresponding to a position of a part correlated to a condition satisfied by a manner of movement of the moving object among the parts of the player characters present within the noted subset area.

3. The game device according to claim 1, wherein
   the plurality of game characters include a game character correlated to an operating group operated by a game player and a game character correlated to an opponent group opposing the operating group, and
   the display controller restricts displaying of an image of the game character correlated to the opponent group among the game characters present within the subset area, and shows the substitute image instead.

4. A game control method for controlling a game device that includes at least one memory and at least one microprocessor, the game control method comprising:
   carrying out, by the at least one microprocessor, a game in which a plurality of game characters appear; and displaying, by the at least one microprocessor, a game screen image including images of the game characters, wherein displaying the game screen image comprises determining a density of game characters within a subset area that is a subset of the game screen image, and when the density is greater than or equal to a non-zero threshold density, restricting displaying of an image of a game character present within the subset area and instead showing a substitute image having a smaller area than the image of the game character in the game screen image.

5. A non-transitory computer readable information storage medium storing a program for causing a computer to function as:

a game executing section that carries out a game in which a plurality of game characters appear; and a display control section that displays a game screen image including images of the game characters, wherein the display control section determines a density of game characters within a subset area that is a subset of the game screen image, and when the density is greater than or equal to a non-zero threshold density, restricts displaying of an image of a game character present within the subset area and instead shows a substitute image having a smaller area than the image of the game character in the game screen image.

6. The game device according to claim 1, wherein the plurality of game characters are displayed on a game field in a game screen image, and the subset area is a subset area of the game field.

7. The game device according to claim 1, wherein replacing the game character comprises displaying the image of the game character as transparent and displaying the substitute image within the transparent game character.

8. The game device according to claim 7, wherein the substitute image is an arrow, a circle, a rectangle, or a triangle.

9. The game device according to claim 7, wherein the substitute image indicates a front side of the game character.

10. The game control method according to claim 4, wherein the plurality of game characters are displayed on a game field in a game screen image, and the subset area is a subset area of the game field.

11. The game device according to claim 1, wherein replacing the game character comprises displaying the image of the game character as transparent and displaying the substitute image within the transparent game character.

12. The game device according to claim 11, wherein the substitute image is an arrow, a circle, a rectangle, or a triangle.

13. The game device according to claim 11, wherein the substitute image indicates a front side of the game character.

14. The computer readable information storage medium according to claim 5, wherein the plurality of game characters are displayed on a game field in a game screen image, and the subset area is a subset area of the game field.

15. The game device according to claim 1, wherein replacing the game character comprises displaying the image of the game character as transparent and displaying the substitute image within the transparent game character.

16. The game device according to claim 15, wherein the substitute image is an arrow, a circle, a rectangle, or a triangle.

17. The game device according to claim 15, wherein the substitute image indicates a front side of the game character.

* * * * *